United States Patent Office 2,902,523
Patented Sept. 1, 1959

2,902,523

PROCESS FOR PRODUCING NORMALLY LIQUID OLEFINIC HYDROCARBONS

Gordon E. Langlois, El Cerrito, and Paul E. Fischer, Concord, Calif., assignors to California Research Corporation, San Francisco, Calif., a corporation of Delaware No Drawing. Application March 29, 1956
Serial No. 574,632

1 Claim. (Cl. 260—683.15)

This invention relates to a process for the production of olefinic hydrocarbons boiling in the range of from about 425° to 650° F. by the catalytic conversion of olefinic hydrocarbon materials boiling below about 425° F.

Propylene polymer fractions boiling in the range of from about 340° to 425° F. containing a relatively large proportion of $C_{12}$ olefin hydrocarbons, termed "propylene tetramers," have heretofore been produced by the polymerization of propylene and have been used to a considerable extent as alkylating agents in the production of alkylated aromatic hydrocarbons particularly valuable as starting materials in the production of detergents. However, the detergent produced from such tetramer alkylate has been found to be unsatisfactory in several respects, such as in relatively poor foaming characteristics and excessive caking, and in order to overcome these defects it has been necessary to employ expensive additives. Accordingly, it is an object of the present invention to provide a process for the production of olefinic hydrocarbons which, when employed as alkylating agents in the production of detergents, provides a product having superior detergency qualities and which does not require the inclusion of such additives. Other objects and advantages of the invention will become apparent from the following detailed description thereof.

According to the present process, a normally liquid olefinic hydrocarbon material boiling below about 425° F. is intimately contacted with a phosphorus-containing polymerization catalyst at a temperature of from about 175° to 325° F. The reaction mix is then separated to recover the desired olefinic hydrocarbon fraction boiling in the range of from about 425° to 650° F.

As a feed to the present process, the subject invention contemplates the use of normally liquid, olefinic hydrocarbons boiling below about 425° F., and more particularly, propylene polymers boiling in the so-called "tetramer" and "trimer" ranges (i.e., polymers having large proportions of $C_{12}$ and $C_9$ hydrocarbons) which are produced by the polymerization of propylene. The polymerization reaction itself is well known in the art and representative polymerization processes from which the feed of the present process can be obtained are those disclosed in U.S. Patent Nos. 2,592,428 (Kemp et al.) and 2,186,021 (Holm et al.). In any case, the source of the feed is immaterial so long as it is composed of normally liquid hydrocarbons composed essentially of olefins boiling below about 425° F. However, it is preferred that the feed contain essentially no saturated hydrocarbons inasmuch as they tend to accumulate in the recycle stream, and provision must be made for their rejection in order to permit sustained operations with reasonable conversions.

In general, the hydrocarbon conversion process of the present invention is conducted at temperatures of from about 175° to 325° F., and preferably at temperatures of from about 200° to 300° F. It is preferred that the reaction be operated at a pressure sufficient to maintain the reaction mixture in the liquid phase. Space velocities above or in excess of 0.01 volume of hydrocarbon per volume of catalyst per hour are entirely suitable.

The present invention provides for the employment of a phosphorus-containing catalyst and particularly those known in the art as polymerization catalysts. With respect to the latter, it is preferred that the catalyst contain phosphoric acid of a concentration of from about 110–120%, calculated as ortho-phosphoric acid and a still more preferred catalyst is liquid phosphoric acid having a concentration within the range of about 112–117%. When operating with this latter catalyst, it is particularly desirable to maintain the reaction temperature in the range of from about 200° to 300° F. It must be understood that the present invention contemplates the use of all of the conventional phosphorus-containing polymerization catalysts although not with the quality of results that can be realized by liquid acid operations. Thus, the use of the so-called acid film type catalyst wherein phosphoric acid is disposed as a thin volume on an inert, nonporous support such as quartz (as described, for example, in U.S. Patent Nos. 2,135,793 and 2,186,021) is within the scope of the present invention as is the "solid phosphoric acid" catalyst described in U.S. Patent No. 1,993,513, and the metal pyrophosphate type described, for example, in U.S. Patent Nos. 2,310,161 and 2,414,206. However, in employing both the acid film and solid type catalyst, it is best to operate under slightly higher temperatures and lower equivalent acid concentrations than in the liquid phosphoric acid catalyzed operation. Thus, good results can be expected with temperatures of from about 275° to 325° F. and $H_3PO_4$ concentrations, calculated as ortho-phosphoric acid, equivalent to about 110–114%.

The results which can be realized by the process of the present invention are illustrated by the following example. In the particular run, a body of liquid phosphoric acid of the noted concentration was continuously charged to a reaction chamber which contained mechanical means for vigorously stirring the acid. The normally liquid olefinic hydrocarbon material was fed into the reaction zone and intimately mixed with the acid. The reaction mixture was continuously passed to a settling zone wherein the acid separated as a lower phase and the hydrocarbon as an upper layer. The acid was returned to the reaction zone, the hydrocarbon layer was passed from the settler and fractionally distilled to recover various boiling range fractions. Those fractions boiling below the initial point of the desired product, namely, about 425° F., were recycled to the reaction zone as a component of the feed. The conditions of the reaction and the results of the run are shown in the following table:

*Table I*

| Run No. | F-140 |
|---|---|
| Operating Conditions: | |
| Temperature, °F | 225 |
| Pressure | Atm. |
| Percent $H_3PO_4$ | 116 |
| Space Rate, V./V./Hr | 1.0 |
| Reactor Feed, Parts by Weight: | |
| $C_9$ Olefinic Hydrocarbon Fraction | 35 |
| $C_{12}$ Olefinic Hydrocarbon Fraction | 65 |
| Reaction Mix, Parts by Weight: | |
| $C_9$ Olefinic Hydrocarbon Fraction | 25.2 |
| $C_{12}$ Olefinic Hydrocarbon Fraction | 46.8 |
| $C_{15}+$ Olefinic Hydrocarbon Fraction | 28.0 |
| Wt. Percent $C_{15}+$ Olefinic Hydrocarbon Fraction boiling in range (425°–650° F.) | 95+ |

From the above tabulation it can be seen the reactor feed was predominantly composed of propylene tetramer, and that of the original 35 parts by weight of the $C_9$ olefinic hydrocarbon fraction (boiling from about 255° to 340° F.), about 10 parts by weight (or approximately 30%) was converted and appears as a component of the desired $C_{15+}$ fraction boiling above 425° F. Of the initial $C_{12}$ fraction (boiling from about 340° to 425° F.) of the feed, amounting to 65 parts per weight, about 18 parts by weight (approximately 28%) was converted to the heavy $C_{15+}$ fraction. It should be noted that, of the $C_{15+}$ fraction produced, over 95 percent boiled in the range from 425° to 650° F.

We claim:

A process for converting normally liquid propylene tetramer polymers to heavier olefinic hydrocarbons boiling in the range 425° F. to 650° F., including pentamer polymers, which comprises passing into intimate contact in liquid phase only a normally liquid hydrocarbon feed boiling below about 425° F. and predominantly composed of propylene tetramer with a liquid phosphoric acid catalyst having a concentration of from about 112–117%, calculated as ortho-phosphoric acid, at a temperature from about 175° F. to 325° F., a pressure sufficient to maintain said liquid phase during said contacting, and a space velocity above about 0.01 volume of hydrocarbon per volume of catalyst per hour and recovering pentamer and heavier polymers from the reaction mixture.

References Cited in the file of this patent

UNITED STATES PATENTS

| | | |
|---|---|---|
| 2,592,428 | Kemp et al. | Apr. 8, 1952 |
| 2,599,743 | Brooke | June 10, 1952 |
| 2,843,641 | Langlois et al. | July 15, 1958 |